United States Patent [19]

Pieper

[11] Patent Number: 4,852,118
[45] Date of Patent: Jul. 25, 1989

[54] ENERGY SAVING METHOD OF MELTING GLASS

[75] Inventor: Helmut Pieper, Lohr/Main, Fed. Rep. of Germany

[73] Assignee: Sorg GmbH & Co. KG, Lohr/Main, Fed. Rep. of Germany

[21] Appl. No.: 195,520

[22] Filed: May 18, 1988

[51] Int. Cl.⁴ .............................................. C03B 5/027
[52] U.S. Cl. ...................................... 373/32; 65/346; 65/347
[58] Field of Search ........................ 373/30, 31, 32, 34, 373/35, 33; 65/134, 135, 136, 335, 346, 347

[56] References Cited

U.S. PATENT DOCUMENTS

| | | | |
|---|---|---|---|
| 2,658,095 | 11/1953 | Arbeit et al. | 373/31 |
| 3,523,780 | 8/1970 | Plumat | 373/32 |
| 4,433,995 | 2/1984 | Toussaint | 373/32 |

Primary Examiner—Roy N. Envall, Jr.
Attorney, Agent, or Firm—Felfe & Lynch

[57] ABSTRACT

Disclosed are an energy saving method for melting glass in and a glass melting furnace for the practice of the method.

A charge is melted in a melting section, clarified in a clarifying section adjoining the melting section, and then homogenized in an adjoining homogenizing section of increased bath depth and drawn therefrom. The charge is fed in at the beginning of the melting section and energy is supplied underneath the charging end through electrodes. The melting energy input is generated by combustion by fossil fuel burners in the clarifying section. The burner flue gases flow over the melting section countercurrently to the charge and are exhausted close to the charge end. The surface of the melting section is swept by a flow coming from the clarifying section countercurrently to the charge.

The invention is also in a glass melting furnace for the practice of this method, in which, for the formation of the hot surface flow as a counterflow to the charge movement, the melting section bottom slopes downwardly from the clarifying section to the charging end. The roof of the furnace between the burner section and the charging section has at least one radiation barrier extending to just above the bath surface.

10 Claims, 1 Drawing Sheet

U.S. Patent     Jul. 25, 1989     4,852,118
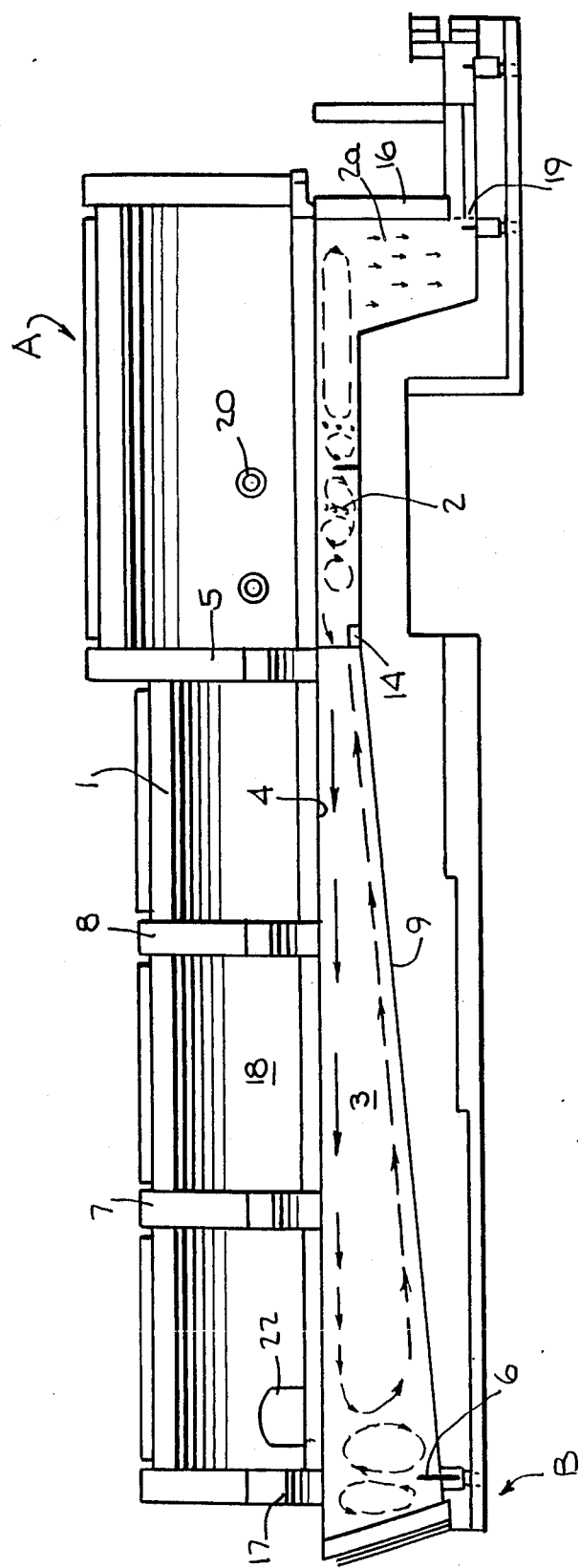

ENERGY SAVING METHOD OF MELTING GLASS

BACKGROUND OF THE INVENTION

The present invention is in an energy saving method of melting glass in a glass melting furnace in which the charge is melted down in a melting section, while the batch of raw materials is delivered into the beginning of the melting section and fed with energy from underneath the charging end. The melted charge is then clarified in a clarifying section adjoining the melting section, then homogenized in a homogenizing section of increased bath depth adjoining the latter section, and drawn from the homogenizing section. The present invention is also in a glass melting furnace for the practice of this method, the furnace having a melting section, a homogenizing section of increased bath depth, and a clarifying section of lesser bath depth disposed between them in which burners are disposed for the input of fossil energy, the exhausting of the combustion gases and the input of the batch being performed at the beginning of the melting section.

Glass melting furnaces have a common disadvantage that despite the use of recuperators or regenerators they have a relatively low efficiency from an energy point of view. This low efficiency is not due to deficient insulation of the glass tanks, but to the fact that the furnace exhaust gas contains considerably more thermal energy than needed to preheat combustion air. There are limits to the temperature to which the combustion air can be raised, since this makes heat exchange very difficult, but the great disadvantage is especially that the concentration of the toxic nitrogen oxides greatly increases.

Various attempts have already been made to use the exhaust gas excess heat in a rational manner. One such attempt involves preheating the charge of raw materials before introducing these materials into the glass melting tank. These attempts, however, have been unsuccessful, because the heating can bring about premature fusion of some of the batch components, causing them to stick to the heat exchange surfaces. On the other hand, if the exhaust gas comes in contact with the batch not only are certain components prematurely fused, but also separation occurs or certain components of the batch are picked up by the exhaust gas, thereby unacceptably increasing the dust content in the exhaust and necessitating the use of expensive dust filter equipment.

It is an object of the invention to provide a method for melting glass, and a glass melting furnace, which will no longer suffer the above-stated disadvantages, but which will have a considerably improved efficiency, while at the same time being economical to build, and especially one in which lower $NO_x$ concentrations will be present along with a lower dust content in the exhaust, without the necessity of dealing with hot, hard-to-handle components in the furnace or in the heat exchange system.

Another object is to provide a furnace wherein the upper furnace temperatures and the temperatures in the heat exchangers (recuperators) are lower than in the commonly known furnaces.

In addition to the above-named advantages, the furnace according to the invention is to be economical to produce and safer in operation, and, in case of need, an extensive exchange of fossil and electrical energy is to be possible.

SUMMARY OF THE INVENTION

The above objects and others are achieved by the present invention. According to the method of the invention, the input of melting energy is performed by fossil fuel burners in the clarifying section of the furnace. The combustion gases sweep through the melting section in the direction opposite that of the charge and are withdrawn close to the charging end. A current coming from the clarifying section flows through the melting section at the surface in a direction opposite to that of the charge of raw materials.

In the apparatus, the object of the invention is achieved in the furnace described above in that, for the formation of the hot surface flow countercurrently to the charge, the bottom of the furnace melting section slopes downward from the clarifying section toward the charging end. The roof of the furnace between the burner section and the batch feed section has at least one radiation barrier reaching down to a point just above the bath surface. Electrodes are near the charging end to deliver electrical energy to that end.

To obtain the advantage of the adjustment of the necessary glass flows, the melting section slopes steadily downward, while the bottom of the clarifying section is level. Bubblers are installed in the bottom of the clarifying section to compensate for the very slight temperature differences between the bottom and the bath surface in the clarifying section.

To insure sufficient area for the heat exchange between the exhaust gases and the batch, the length of the melting section is advantageously between three times and five times as great as the length of the clarifying section. It is also advantageous to position the electrodes under the batch feed, so as to induce a current flow in their proximity. The induced flow current moves downwardly toward the direction of the clarifying section relative to the electrode, deflecting the hot glass stream in the melting section downwardly, thereby reinforcing the return flow along the bottom toward the clarifying section.

To sufficiently preheat the batch, it is advantageous for the melting section to have two to five times the length of the clarifying section. Efficiency losses through thermal transfer by radiation from the burner section can be prevented or reduced by a radiation barrier between the clarifying section and the melting section.

A special advantage of the glass melting method and furnace according to the invention is that the exhaust gases are cooled to 800° to 1000° C. by preheating the charge lying on the glass bath up to the exit from the tank chamber, and without any great technical difficulty the recuperators can at the same time heat the air countercurrently to about 700° C.

It can be seen that the glass melting furnace according to the invention, in conjunction with the method of its operation, is capable of solving the stated problems in an especially advantageous manner. The principle of the invention is to feed the batch onto the glass bath and there to preheat it with the exhaust gas so as to cool the exhaust gas to such an extent that the remaining energy can be used almost entirely for heating the combustion air. The maintenance of the fluidity of the glass and the establishment of an optimum pattern of flow in the charge-preheating part of the tank is at the same time assured by the input of comparatively small amounts of electrical energy.

The various features of novelty which characterize the invention are pointed out with particularity in the claims annexed to and forming a part of this specification. For a better understanding of the invention, its operating advantages and specific objects obtained by its use, reference should be had to the accompanying drawings and descriptive matter in which there is illustrated and described a preferred embodiment of the invention.

BRIEF DESCRIPTION OF THE DRAWING

The FIGURE shows a longitudinal section through a glass tank according to and useful in the invention.

DESCRIPTION OF PREFERRED EMBODIMENT

Referring to the Figure, a glass melting furnace A consists of an elongated rectangular tank B with a clarifying section 2 and a melting section 3 which merge with one another. The melting section 3 has a length that is about 3 to 5 times as great as that of the clarifying section 2. The tank has a level part which forms a burner section C and houses burners 20 which serve for the burning of oil or gas.

Tank B furthermore has at the burner end (end closest to burner section C) a transverse wall 16, on the batch feed end a transverse wall 17 and longitudinal walls 18. The furnace top is formed by a cover 1. The tank bottom is identified as 9.

Bottom electrodes 6 are disposed underneath the charging section and prevent freezing of the glass bath in this area, especially in the direct range of the charge layer. Freezing is furthermore prevented by a surface flow established within the melting section 3. The surface flow continuously feeds glass from the clarifying area 2, where it has been highly heated by the burners 20, into the charging area.

The charging is performed in a conventional manner on the entire width of the transverse wall 17. In detail, the tank is built according to conventional technology, as it is described also in older applications of the Applicant, so that no further description is needed. This applies especially to the configuration of the walls, the vault, the bottom, the burners, the electrodes and the outlet 19 at the end of the homogenization section 2a remote from the batch feed, and to the configuration of the exhaust gas stack openings 22 directly adjacent the batch feed.

In the interior of the tank, at the entry end of the clarifying section, a radiation barrier 5 extends from the roof to a point just above the bath surface 4. Radiation barrier 5 prevents radiation from reaching the melting section 3. At high chamber temperatures most of the energy is transmitted by radiation and it is therefore important to the invention to concentrate the energy delivered by the burners 20 in the clarifying section 2.

Since considerable additional amounts of radiation emanate from the bath surface and especially from the barrier 5 toward the charging end, the melting section 3 has a second radiation barrier 7 proximate to the charging end and a third barrier 8 intermediate barriers 5 and 7. Such an arrangement retards or prevents any appreciable amount of radiant energy from reaching the charging section D and heating the charge. The heating of the charge is thus performed almost exclusively by the flue gas which flows from the clarifying section 2 through the melting section 3 to the exhaust openings 22.

Optionally, tank bottom 9 at the charging end of the clarifying section 2 has a threshold 14 which establishes a flow pattern in which hot glass floats on the bath surface back to the floating charge layer and there, in conjunction with the bottom electrodes 6, prevents the glass from freezing.

The exhaust gas, cooled to about 900° C., is fed after emerging from the tank to recuperators from which it emerges at a temperature of about 150° to 250° C. At this temperature the energy residing in the exhaust gas has largely been transferred to the combustion air.

In the recuperators the cooling exhaust gas preheats the combustion air to a temperature of about 700° C. The combustion air then passes through tubes to the burners 20. Since combustion takes place on the basis of relatively low air temperatures the flame temperatures are relatively low and therefore the concentration of the forming nitrogen oxides is not excessively high. The exhaust gas therefore is not excessively cooled, and has extremely low concentrations of nitrogen oxides, so that operation of the glass melting furnace according to the invention is possible also in low emission regions, e.g., in cities, inasmuch as the use of a dust filter is easily possible on account of the low exhaust temperatures.

It is important to the operation of the tank that the melting section 3 serves at its charging end exclusively for the preheating of the charge and that substantial melting of the charge does not take place until it reaches the burner end of the melting section 3. Then a clarification of the glass takes place in the clarifying section 2 before it is withdrawn in a known manner through a bottom tap 19.

Air is introduced through the bottom in the clarifying section 2 through a number of bubblers 23. This introduced air, with the help of bottom electrodes if desired, produces a strong stirring of the glass in the clarifying section 2, so that the temperature gradient from top to bottom in the clarifying section is very low. This assures that the bath surface will reach temperatures of about 1500° C., while the vault temperature above the clarifying section 2 will not exceed temperatures of 1550° C. The temperatures in the melting section 3 on the other hand are considerably lower, amounting to 900° to 1300° C. from the charging end to the clarifying section 2.

Homogenization of the glass is performed in homogenizing section 2a with cooling so that an optimum temperature stratification is established which prevents circulatory flows and thus prevents bubbly and non-homogeneous glass from reaching the outlet.

The radiation barriers 5, 7 and 8 cause the establishment of a gas velocity over the charge of about 10 to 15 m/s, which permits a certain transfer of heat by convection in addition to the radiant thermal transfer. The radiant barriers are similar in construction to large doghouse bays.

The electrical energy input can furthermore be selected in proportion to the energy input by the burners such that the nitrogen oxide mass flow does not exceed the allowable levels. As the proportion of the electrical energy inceases the $NO_x$ mass flow decreases and it increases as the proportion decreases.

The glass melting furnace according to the invention can be constructed economically, since less expensive refractory material can be used in the charging section on account of the lower temperatures.

In the entire glass melting furnace, the ducts for the exhaust gas and for the heated combustion air are highly insulated. Nevertheless it is surprising to the skilled practitioner of the art that the specific energy consumption can be reduced to the previously unattained level of 3100 to 3400 kilojoules per kilogram of glass.

The terms and expressions which have been employed are used as terms of description and not of limitation, and there is no intention in the use of such terms and expressions of excluding any equivalents of the features shown and described or portions thereof, it being recognized that various modifications are possible within the scope of the invention.

I claim:

1. A method of melting glass in a glass furnace having a tank with a bottom comprising:
    introducing a charge of raw glass into the furnace at a charging section thereof;
    adding energy through electrodes at the charging section;
    melting the charge in a melting section of the furnace to form a melt;
    clarifying the melt in a clarifying section;
    then homogenizing the clarified melt;
    adding melting energy in the clarifying section by combusting a fuel to produce a flue gas containing thermal energy;
    forming a flow of charge descending toward the melting section which deflects the melt in the melting section downwardly to intensify a back flow along the tank bottom to the clarifying section;
    causing the flue gases to flow across the surface of the melt countercurrent to the flow of the charge; and
    exhausting the flue gases from the furnace at the charging end.

2. The method of claim 1 further comprising blowing air through the bottom of the clarifying section.

3. The method of claim 1 further comprising absorbing thermal radiation from the clarifying section.

4. A glass melting furnace comprising:
    a charging section having electrical energy means;
    a melting section adjacent said charging section, said melting section having a bottom sloping in the direction of the charging section;
    a homogenization section;
    a clarifying section intermediate to and having a lesser depth than said melting and homogenization sections;
    burner means to combust a fuel to produce exhaust gases, said burner means being disposed in said clarifying section;
    roof means with at least one radiation barrier extending from said roof means to just above the bath surface; and
    flue gas exhaust means located adjacent the charging and melting sections.

5. The glass melting furnace of claim 4 wherein the sloping bottom has a substantially constant slope over the length of the melting section.

6. The glass melting furnace of claim 4 wherein the bottom of the clarifying section is substantially level.

7. The glass melting furnace of claim 4 further comprising bubbling means in said clarifying section.

8. The glass melting furnace of claim 4 wherein the ratio of the length of the clarifying section to the length of the melting section is between 1 to 3 and 1 to 5.

9. The glass melting furnace of claim 4 with a threshold underneath the least one radiation barrier.

10. A method of melting glass in a glass furnace having a tank with a bottom comprising:
    introducing a charge of raw glass into the furnace at a charging section thereof;
    adding energy through electrodes at the charging section;
    melting the charge in a melting section of the furnace to form a melt;
    clarifying the melt in a clarifying section which has a boundary;
    then homogenizing the clarified melt;
    adding melting energy in the clarifying section by combusting a fuel to produce a flue gas containing thermal energy;
    forming a flow of charge descending toward the melting section which deflects the melt in the melting section downwardly to intensify a back flow along the tank bottom of the clarifying section;
    causing the flue gases to flow across the surface of the melt countercurrent to the flow of the charge;
    absorbing thermal radiation at the boundary of the clarifying section and over the melting section; and
    exhausting the flue gases from the furnace at the charging end.

* * * * *